United States Patent Office 2,999,808
Patented Sept. 12, 1961

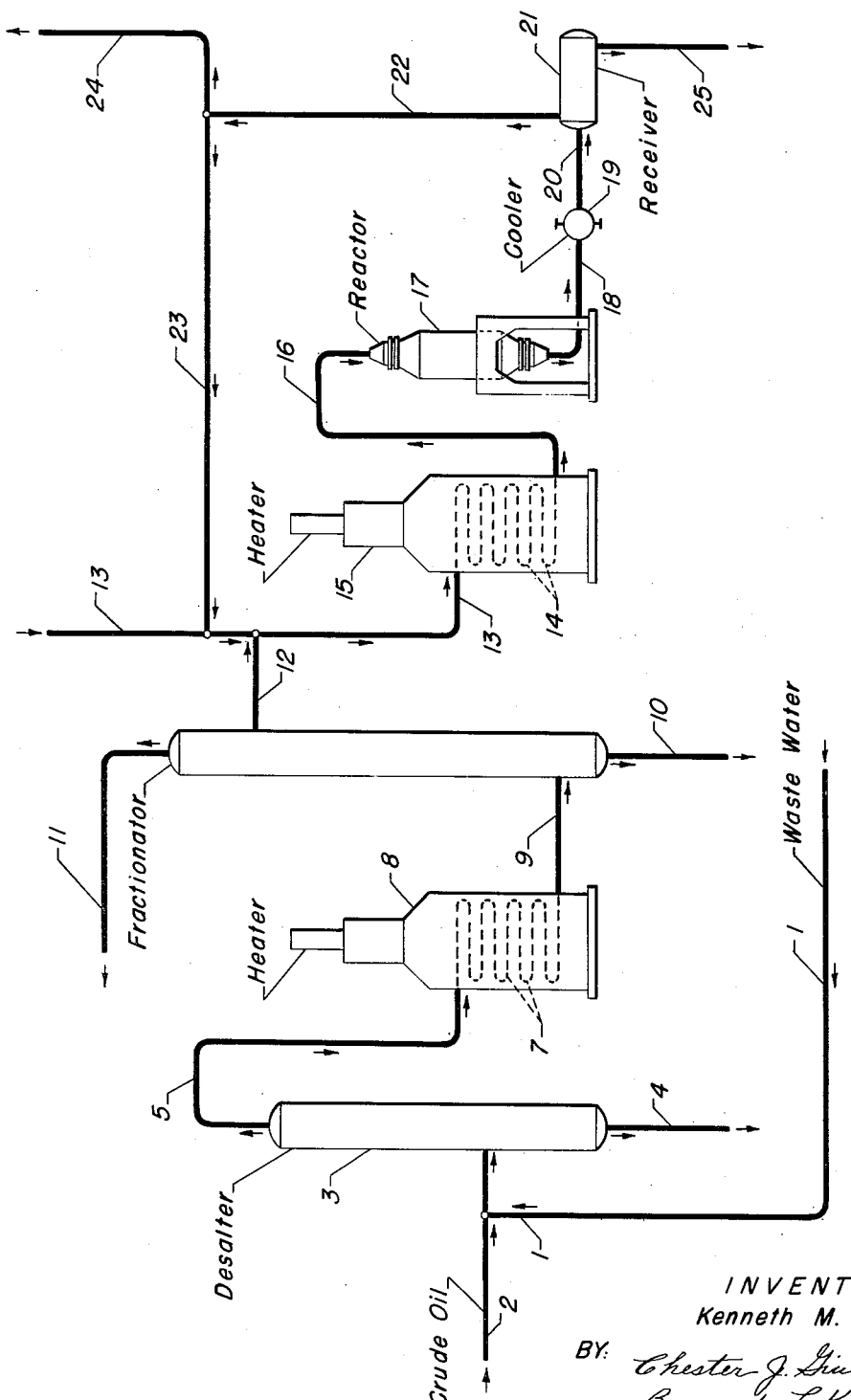

2,999,808
WASTE WATER TREATMENT
Kenneth M. Brown, Hinsdale, Ill., assignor, by mesne assignments, to Universal Oil Products Company, Des Plaines, Ill., a corporation of Delaware
Filed Dec. 26, 1957, Ser. No. 705,209
6 Claims. (Cl. 208—264)

This invention relates to the treatment of refinery waste water and more particularly to a novel method of treating refinery waste water so that it may be disposed of safely or is satisfactory for reuse within the refinery.

In a petroleum refinery, large quantities of water are used for various purposes, such as purifying petroleum fractions, steam distillation, dilutions, diluting corrosive materials, etc. More specifically, water in the form of steam is used, for example, in a catalytic cracking unit to increase the velocity of the flow in the riser or to strip entrained oil from the catalyst passing from the reaction zone to the regeneration zone. Water also is used in a catalytic cracking process as a diluent for the aqueous phase in the overhead receiver of the primary fractionator. Water similarly is used in the overhead receiver of a catalytic reforming process, as well as being used to wash a polymerization unit feed stock. During use the water contacts hydrocarbon fractions containing phenols and part of the phenols are transferred from the hydrocarbon streams to the water. The water from the various parts of the refinery are accumulated and, as hereinbefore set forth, contain phenols.

Formerly the water containing phenols was disposed of by discharging into an available large body of water. However, with the increase in the size and number of refineries the amount of contaminants contained in the water reached such proportions as to pollute streams or lakes to an extent that may be detrimental to fish and other marine life and also may interfere with other desired uses of the water. Accordingly, the matter of disposing of refinery waste water is a major problem. Furthermore, in many areas, water is not available in sufficient quantity so that it may be used only once and discarded. It therefore is advantageous, and in some cases essential, to reuse the water. However, the water must be treated to remove contaminants prior to reuse of the water in the refinery.

In accordance with the present invention, water containing phenols is accumulated and treated in the following manner to remove the phenols so that the water can be disposed of safely or reused satisfactorily in the refinery. While the water used at the various stages of the refinery operations also will absorb other contaminants, many of these other contaminants are volatile and can be removed from the water by flashing, distillation or stripping operations. However, the phenols are relatively non-volatile at the conditions which will strip out other contaminants, and the phenols will remain in the water. Since the phenols constitute a serious contaminant, the present invention is directed to the removal of the phenols from the water so that the latter may be disposed of safely or reused within the refinery satisfactorily.

In one embodiment the present invention relates to a method of removing phenols from water contaminated therewith, which comprises contacting said water with crude oil to thereby transfer a major portion of the phenols from said water to said crude oil, withdrawing treated water reduced in phenol content, separately withdrawing crude oil containing phenols, fractionating said crude oil containing phenols to separate a low boiling fraction substantially free of phenols, an intermediate boiling fraction containing phenols, and a high boiling fraction substantially free of phenols, and subjecting at least a portion of said intermediate boiling fraction containing phenols to hydrotreating at a temperature of from about 500° to about 1200° F. to remove phenols from said intermediate boiling fraction, and recovering a hydrotreated oil substantially free of phenols.

Most, if not all, refineries subject crude oil to a desalting treatment prior to further processing of the crude oil. In general, the desalting is effected by heating, heating in the presence of a chemical or by electrical separation. In any event water generally is utilized in the desalting step and an advantage of this available processing step is taken in the novel process of the present invention. In accordance with the present invention, waste water containing phenols is utilized as part or all of the water in the desalting operation. In this step of the process a substantial portion of the phenols contained in the water is transferred to the crude oil. Generally a large volume of crude oil is subjected to desalting and a much smaller volume of water is used in this step of the process. Therefore, transfer of phenols from the water to the crude oil is substantial and may remove up to 95% or more of the phenols from the water. The water recovered from the desalting step, accordingly, is considerably reduced in phenol content and, upon dilution with other phenol-free water from the refinery, can be safely discarded into neighboring lakes or rivers or may be reused satisfactorily within the refinery.

The crude oil from the desalting step of the process now contains phenols. However, the phenols will be concentrated in a specific fraction of the crude oil and, in accordance with the present invention, the crude oil is separated into a low boiling fraction which is free of phenols, an intermediate boiling fraction which contains the phenols, and a high boiling fraction which is substantially free of phenols. In general, the low boiling fraction will contain components boiling up to about 300° F., the intermediate boiling fraction will contain components boiling within the range of from about 300° to about 650° F. and the higher boiling fraction will contain components boiling above 650° F. The intermediate boiling fraction containing the phenols then is subjected to hydrotreating. It has been found that the effluent product from such hydrotreating is substantially free of phenols even though the hydrocarbon oil charge to the hydrotreating contains phenols. Apparently during the hydrotreating phenols are destroyed, presumably being converted into water and hydrocarbons and particularly aromatic hydrocarbons. Thus, 99.9% or more of the phenols contained in the charge to hydrotreating do not appear in the effluent product. Accordingly, in the present invention, the intermediate boiling fraction of the crude oil containing phenols is subjected to hydrotreating, which treatment serves to produce an effluent product substantially free of phenols.

The invention will be explained further with reference to the accompanying flow diagrammatic drawing which illustrates a preferred embodiment of the invention. In the interest of simplicity, valves, pumps, compressors and similar appurtenances have been omitted from the drawing but will be provided as required.

Referring to the drawing, waste water containing phenols is introduced through line 1 and is passed, along with crude oil introduced through line 2, into desalter 3. In desalter 3 a substantial portion of the phenols contained in the waste water is transferred to the crude oil. As hereinbefore set forth, generally a large volume of crude oil is contacted with a much smaller volume of water in the desalting treatment and thus a substantial portion of the phenols will pass from the water phase into the oil phase. Accordingly, a treated water substantially reduced in phenol content is recovered by such treatment, the treated water being withdrawn through line 4 from desalter 3.

Crude oil containing phenols is removed from desalter 3 through line 5 and is passed into fractionator 6. Fractionator 6 may contain conventional contacting means including, for example, side to side pans, baffles, bubble trays, bubble decks, etc. In order to effect the desired separation in fractionator 6, the crude oil must be heated to the desired temperature and this may be accomplished in any suitable manner including, for example, passing the crude oil through coils 7 in heater 8 and then through line 9 into fractionator 6. In general the crude oil will be heated to a temperature within the range of about 600° to about 700° F. although lower or higher temperatures may be used in some cases. Fractionator 6 normally is cooled at the top and this generally is accomplished by condensing a portion of the overhead product therefrom and returning the condensate to the upper portion of the fractionator to serve as a cooling and refluxing medium therein. However, this operation is conventional and has been omitted from the drawing in the interest of simplicity.

In any event, the crude oil containing phenols is separated in fractionator 6 into a low boiling fraction which is withdrawn from the upper portion of fractionator 6 through line 11, an intermediate boiling fraction which is withdrawn through line 12, and a high boiling fraction which is withdrawn through line 10. The phenols will be concentrated in the intermediate fraction. Accordingly, the low boiling fraction withdrawn through line 11 and the high boiling fraction withdrawn through line 10 will be substantially free of phenols and need not be subjected to further treatment for removing phenols. However, the intermediate boiling fraction will contain the phenols and is subjected to hydrotreating in the manner to be hereinafter described in order to remove the phenols therefrom.

The intermediate boiling fraction is passed through lines 12 and 13 into coils 14 of heater 15. The hydrotreating is effected in the presence of hydrogen, which may be introduced into the process through line 13 or recycled from within the process in the manner to be hereinafter described, and commingled with the intermediate boiling fraction in line 13. Any suitable source of hydrogen may be used in this step of the process and conveniently comprises excess hydrogen recovered from a catalytic hydro-reforming process and particularly from the Platforming process, in which process gasoline is reformed in the presence of hydrogen and a catalyst comprising alumina, platinum and combined halogen.

The intermediate boiling fraction and hydrogen are heated in coils 14 to a temperature within the range of from about 300° and preferably from about 500° to about 1200° F. and still more preferably of from about 500° to about 800° F., at a pressure within the range of from about 50 to about 5,000 pounds per square inch and preferably of from about 100 to about 1000 pounds per square inch. Hydrogen is present in the reaction zone in a ratio of from about 1 to about 20 and preferably of from about 4 to about 8 moles of hydrogen per mole of hydrocarbon. It is understood that the hydrogen may be heated in a separate zone and either comingled with the separately heated hydro-carbon oil and introduced into the reactor or separately introduced thereto. In the case here illustrated, the heated mixture of intermediate boiling fraction and hydrogen is directed from heater 15 through line 16 into reactor 17. While only one reactor is here illustrated, it is understood that two or more of such zones may be employed.

In a preferred embodiment zone 17 contains a suitable catalyst to effect the hydrotreating. A particularly preferred catalyst is of the alumina-cobalt-molybdenum type and contains from about 1% to about 10% by weight of cobalt oxide or cobalt sulfide and from about 2% to about 15% by weight of molybdenum oxide or molybdenum sulfide, the remainder comprising alumina. It is understood that any suitable hydrotreating catalyst may be employed and may comprise, for example, a composite of alumina-nickel oxide, alumina-nickel sulfide, alumina-nickel sulfide-tungsten sulfide, alumina-nickel sulfide-cobalt sulfide, etc. In some cases a catalyst containing platinum, palladium or the like may be employed in this step of the process. While alumina is generally preferred as a component of the catalyst, in some cases other refractory oxides may be used including, for example, silica, magnesia, thoria, zinc oxide, etc., mixtures thereof or mixtures of these with alumina and particularly a composite of silica-alumina, silica-magnesia, silica-zirconia, etc. In some cases, when a more active catalyst is used as, for example, a catalyst containing nickel, a lower temperature may be used and may be as low as 300°F.

In reactor 17 the intermediate boiling fraction is subjected to treatment in the presence of hydrogen and, as hereinbefore set forth, phenols contained in the charge to this step of the process are destroyed. Accordingly, the effluent product is substantially free of phenols, as well as being substantially reduced in sulfur and possibly nitrogen compounds when these impurities are present in the charge.

The effluent product is withdrawn from reactor 17 through line 18, cooled in cooler 19 and passed by way of line 20 into receiver 21. In receiver 21 normally gaseous components, which comprise primarily hydrogen and light hydrocarbons and also will contain hydrogen sulfide, possibly ammonia, etc., are separated from liquid products and are withdrawn from the upper portion thereof through line 22. In many cases the gaseous fraction is sufficiently high in hydrogen content to warrant its reuse in the process and, accordingly, all or a portion of the gas fraction is directed by way of lines 23 and 13 into heater 15 for reuse in the hydrotreating step of the process. When the gaseous fraction is too high in undesirable components, all or a portion thereof may be removed from the process through line 24. In some cases part of the gas fraction may be recycled by way of lines 23 and 13 and part withdrawn through line 24.

The liquid product is withdrawn from receiver 21 through line 25 and, as hereinbefore set forth, the liquid product is substantially free of phenols. The liquid product may be used as such for any desired purpose or it may be subjected to conventional fractionation or other treatment, not illustrated, for any further use as desired.

The following example is introduced to illustrate further the novelty and utility of the present invention but not with the intention of unduly limiting the same.

In this example 600 barrels per day of waste water containing 350 parts per million of phenols is accumulated in the refinery. The waste water is commingled with 12,000 barrels per day of crude oil and sent to a desalter which is operated at a temperature of about 230° F. The water withdrawn from the desalter contains about 15 parts per million of phenols and, upon dilution with phenol-free water recovered within the refinery, may be discharged safely into a neighboring stream.

The crude oil from the desalter contains phenols and is heated to 650° F. and then subjected to fractionation to separate a light fraction having an end boiling point of 300° F., an intermediate fraction boiling from about 300° to about 650° F., and a heavy fraction boiling above about 650° F. The intermediate fraction is commingled with hydrogen in a ratio of 6 moles of hydrogen per mole of hydrocarbon and the mixture is heated to a temperature of 750° F. at a pressure of 700 pounds per square inch. The heated mixture then is passed downwardly through a reactor containing a catalyst comprising alumina, 3% by weight of cobalt sulfide and 5% by weight of molybdenum sulfide. The effluent product from the reactor is cooled and separated into a gaseous stream and a liquid stream. In this operation the gases are not recycled within the process but hydrogen from an adjoining Platforming Unit is utilized in the hydrotreating reaction. The liquid product is now substantially free of phenols and may be used for any desired purpose.

I claim as my invention:

1. The method of removing phenols from water contaminated therewith which comprises commingling said water with crude oil and desalting the crude in admixture with said water, thereby transferring a major portion of the phenols from said water to said crude oil, withdrawing treated water reduced in phenol content, separately withdrawing crude oil containing phenols, fractionating said crude oil containing phenols to separate a low boiling fraction substantially free of phenols, an intermediate phenol-containing fraction boiling from about 300° to about 650° F. and a high boiling fraction substantially free of phenols, and subjecting at least a portion of said intermediate boiling fraction containing phenols to treatment with hydrogen at a temperature of from about 300° to about 1200° F. to remove phenols from said intermediate boiling fraction, and recovering a hydrotreated oil substantially free of phenols.

2. The method of removing phenols from water contaminated therewith which comprises contacting said water with crude oil to thereby transfer a major portion of the phenols from said water to said crude oil, withdrawing treated water reduced in phenol content, separately withdrawing crude oil containing phenols, fractionating said crude oil containing phenols to separate a light fraction comprising components boiling up to about 300° F., an intermediate phenol-containing fraction comprising components boiling from about 300° to about 650° F., and a heavy fraction comprising components boiling above about 650° F., subjecting said intermediate fraction to treatment with hydrogen at a temperature of from about 500° to about 800° F. to remove phenols from said intermediate fraction, and recovering a hydrotreated oil substantially free of phenols.

3. The process of claim 2 further characterized in that said treatment with hydrogen is effected in the presence of a catalyst comprising a refractory oxide, cobalt sulfide and molybdenum sulfide.

4. The process of claim 2 further characterized in that said treatment with hydrogen is effected in the presence of a catalyst comprising alumina, cobalt sulfide and molybdenum sulfide.

5. The process of claim 2 further characterized in that said treatment with hydrogen is effected in the presence of a catalyst comprising alumina, cobalt oxide and molybdenum oxide.

6. The process of claim 2 further characterized in that the crude oil is desalted in admixture with the phenol-contaminated water.

References Cited in the file of this patent

UNITED STATES PATENTS

| 2,393,288 | Byrns | Jan. 22, 1946 |
| 2,785,120 | Metcalf | Mar. 12, 1957 |

FOREIGN PATENTS

| 450,789 | Great Britain | July 24, 1936 |